No. 725,733. PATENTED APR. 21, 1903.
W. MAASCH.
WAGON.
APPLICATION FILED JULY 29, 1902.
NO MODEL.
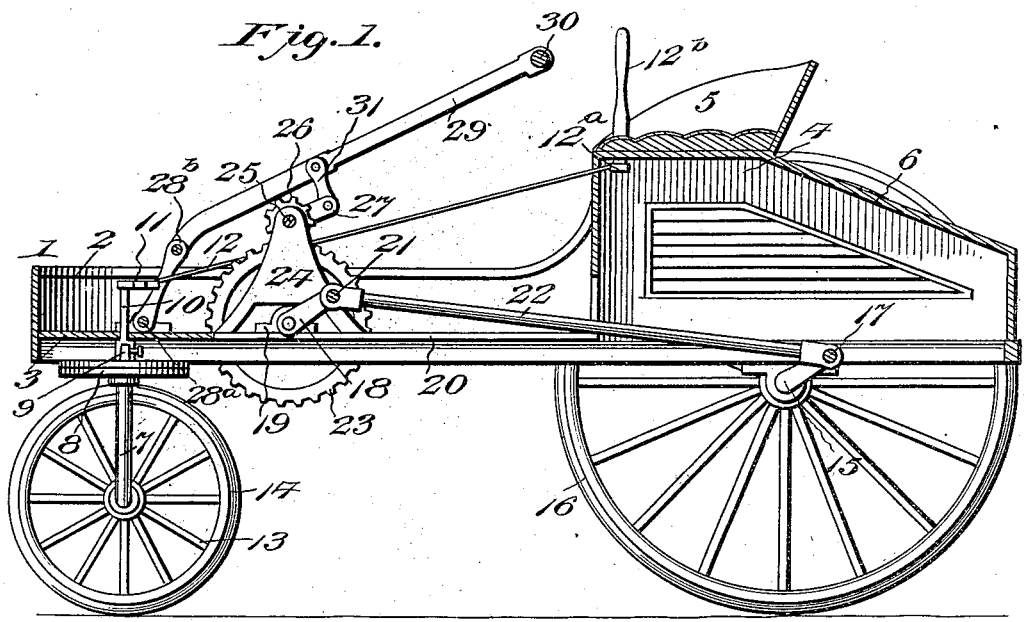
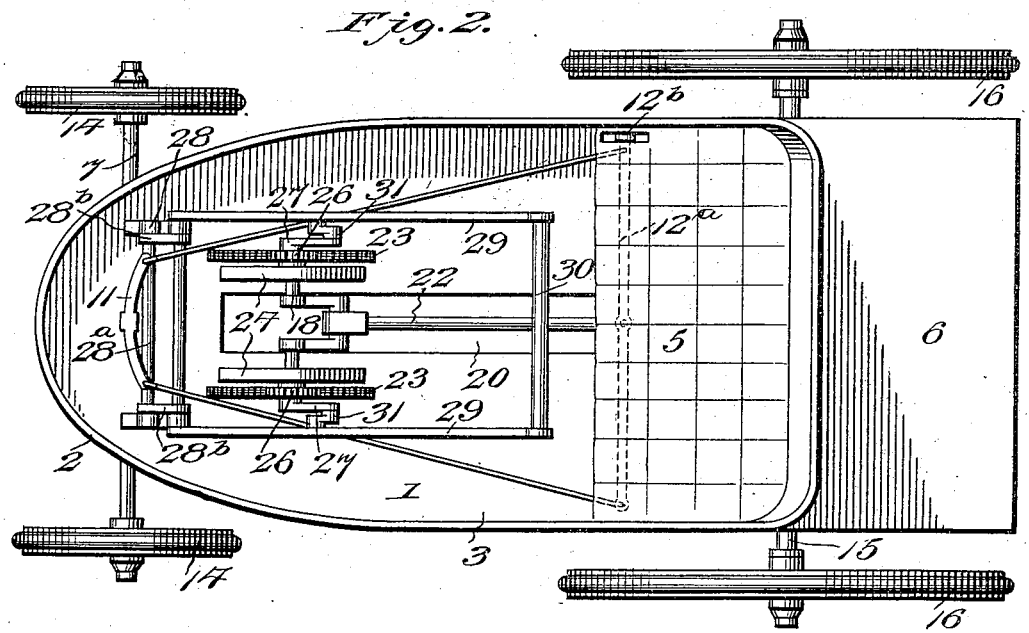
Witnesses
Edwin G. McKee
Chas. S. Hyer.
Inventor
William Maasch
By Victor J. Evans
Attorney

UNITED STATES PATENT OFFICE.

WILLIAM MAASCH, OF BROOKLYN, NEW YORK.

WAGON.

SPECIFICATION forming part of Letters Patent No. 725,733, dated April 21, 1903.

Application filed July 29, 1902. Serial No. 117,489. (No model.)

*To all whom it may concern:*

Be it known that I, WILLIAM MAASCH, a citizen of the United States, residing at 2674 Atlantic avenue, Brooklyn, in the county of Kings and State of New York, have invented certain new and useful Improvements in Wagons, of which the following is a specification.

This invention relates to manually-propelled vehicles; and the object of the same is to provide a comparatively simple and effective device of this character embodying positive mechanism operative either by one or two occupants of the vehicle and so proportioned and constructed that by a minimum amount of applied actuating power through the medium of an upwardly-projecting oscillating hand engaging device a forceful driving power will be imparted to the rear axle without lost motion.

The invention consists in the construction and arrangement of the several parts, which will be more fully hereinafter described and claimed.

In the drawings, Figure 1 is a longitudinal vertical section of a vehicle embodying the features of the invention. Fig. 2 is a top plan view thereof.

Similar numerals of reference are employed to indicate corresponding parts in both views.

The numeral 1 designates the body of the vehicle, comprising a surrounding rim 2 of suitable material, preferably of wood, a flooring or bottom 3, a seat-box 4, having a suitable seat 5 thereon, and a boot 6.

Though a specific form of vehicle-body has just been described, it will be understood that the success in operation of the several mechanical parts contributing to the effective propulsion of the vehicle embodying the particular features of the invention are not dependent upon any precise form of body, and the latter may be varied at will in contour, shape, or general style or type.

The front axle 7 is arched and connected to a suitable fifth-wheel construction 8 or circle plates, the upper portion of the said axle having a central upstanding angular projection 9, engaged by the lower socketed end of a steering-post 10, projecting upwardly through the bed 3 and provided with opposite horizontal arcuate arms 11, steering cords, wires, chains, or the like being attached to the outer terminals of said arms 11, as at 12, and extended to the rear and suitably connected to a lever $12^a$, pivotally mounted upon the under side of the seat-box 4. This lever $12^a$ is provided at one end thereof with an upwardly-projecting arm $12^b$, passing through a slot in the seat-box to place the upper end thereof in convenient reach of the occupant of the vehicle. The axle 7 has suitable steering-wheels 13 thereon of such diameter that they may be turned under the front portion of the body and are preferably provided with rubber tires 14, either of the pneumatic or the solid type. By operating the cords, chains, cables, or the like connected to the arms 11 through the medium of the arm $12^b$ the direction of movement of the vehicle may be varied at will.

The rear axle 15 is journaled in suitable bearings to permit a rotary movement being imparted thereto, and keyed to the terminals thereof are propelling-wheels 16, supplied with pneumatic or solid elastic tires. The center of the axle is formed with a crank 17, and at a suitable point in advance thereof a crank-shaft 18 is journaled in bearings 19, situated to either side of a longitudinal slot 20 in the flooring 3. This crank-shaft is formed with a central crank 21, connected to the crank 17 by a crank-rod 22, adapted to pass through the slot 20. The terminals of the crank-shaft 18 have keyed thereon pinions 23, adapted to have motion imparted thereto, which motion is transferred through the crank-shaft 18 to the axle 15, carrying the propelling-wheels 16 to propel the vehicle.

Situated directly above the bearings 19 are bearing-carrying brackets 24, provided near the upper ends thereof with bearings, in which is journaled a shaft 25. The ends of the shaft 25 are provided with pinions 26 of a diameter smaller than that of the pinions 23, with which they mesh, and keyed to the extremities of the shaft are socketed cranks 27. Bearings 28 are secured to the flooring 3 in advance of the bearing-carrying brackets 24, and journaled in said bearings is a rock-shaft $28^a$, provided with upwardly-projecting arms $28^b$, having bearings adapted to receive a bar carried by and at the lower ends of the legs of a hand-bar 29. The legs of the hand-bar 29 are connected at their upper ends by a cross-bar 30, which may be transversely extended any suitable distance.

The above manner of connecting the hand-bar to the flooring 3 permits of the same having imparted thereto reciprocatory and oscillatory movements, and intermediate the ends of the legs thereof are pivotally mounted links 31, having connection at their lower ends with the cranks 27, whereby when the hand operating device has motion imparted thereto the pinions 26 are caused to rotate, which rotation is imparted to the pinions 23 to cause the vehicle to be propelled. By the introduction of the links 31 between the legs of the hand operating device and the shaft 25 the stiff resistance to rotation of the crank axle or shaft carrying the propelling-wheels 16, which would exist if the said hand operating device was directly attached to the terminals of the cranks 27, is overcome, and the driving mechanism is thereby under easy control of the occupant or occupants of the vehicle. Furthermore, by means of the arrangement set forth a greater power can be obtained, and the throw of the hand operating device in its alternating reciprocatory and oscillatory movements is materially reduced, with less inconvenience to the operator.

The occupant or occupants of the vehicle in actuating the mechanism set forth engage the cross-bar 30 and alternately impart to the hand operating device reciprocatory and oscillatory movements, and thereby rotate the pinions 26, the rotation of the latter being transferred to the pinions 23, which causes the shaft 18 to revolve. The revolution of the shaft 18 imparts to the crank-rod 22 a reciprocatory motion, which, in view of its connection with the axle 15, causes the latter to revolve, thereby imparting rotation to the propelling-wheels 16 to propel the vehicle.

The improved mechanism will be found exceptionally convenient and comparatively inexpensive in view of the simplicity of the same, and it is proposed to resort to changes in the form, proportion, dimensions, and minor details without in the least departing from the principle of the invention.

Having described my invention, what I claim is—

1. In a vehicle of the character described, the combination with a body provided with a longitudinally-arranged slot in the bottom thereof, of steering-wheels, a rear axle provided with a crank and revolubly secured to the body, drive-wheels carried by the axle, bearings situated on each side of the slot and near the front portion thereof, a crank-shaft journaled in the bearings, a crank-rod joining the crank and crank-shaft and adapted to extend through the slot, pinions carried by the crank-shaft, bearing-brackets mounted above the bearings, a shaft carried by said brackets, pinions carried by the shaft to mesh with the first-mentioned pinions, a rock-shaft journaled in advance of the pinions, arms carried by the rock-shaft, a hand-bar having the lower ends thereof connected to the arms, cranks carried by the shaft, and links interposed between the hand-bar and the last-mentioned cranks.

2. In a vehicle of the character described, the combination with a body, of steering-wheels, a rear axle provided with a crank, drive-wheels carried by the axle, a crank-shaft, a crank-rod connecting the crank and crank-shaft, pinions carried by the crank-shaft, a shaft journaled above the pinions, pinions carried by the shaft and adapted to mesh with the first-mentioned pinions, a rock-shaft, arms carried by the rock-shaft, a hand-bar having the lower ends thereof secured to the arms, cranks carried by the shaft, and links interposed between the last-mentioned cranks and the hand-bar.

3. In a vehicle of the character described, the combination with a body, of a front axle secured thereto, steering-wheels journaled on the axle, a steering-post connected to the axle, arcuate arms secured to the steering-post, a pivotally-mounted lever, a handle secured to the lever, means connecting the lever and arms, a rear axle provided with a crank, a crank-shaft, a crank-rod connecting the crank and crank-shaft, pinions carried by the crank-shaft, a shaft mounted above the pinions, pinions carried by the shaft to mesh with the first-mentioned pinions, a rock-shaft, arms secured to the rock-shaft, a hand-bar having the lower ends thereof connected to the arms, cranks fixed to the shaft, and links interposed between the hand-bar and last-mentioned cranks.

In testimony whereof I affix my signature in presence of two witnesses.

WILLIAM MAASCH.

Witnesses:
CHRIS. J. ROCHE,
W. F. DAVID.